R. H. ALDRICH.
FLEXIBLE COUPLING.
APPLICATION FILED JUNE 29, 1917.

1,264,742.

Patented Apr. 30, 1918.

WITNESSES

INVENTOR
R. H. Aldrich
BY
ATTORNEYS

UNITED STATES PATENT OFFICE.

ROSCOE HILTON ALDRICH, OF ALLENTOWN, PENNSYLVANIA, ASSIGNOR TO THE ALDRICH PUMP COMPANY, OF ALLENTOWN, PENNSYLVANIA, A CORPORATION OF PENNSYLVANIA.

FLEXIBLE COUPLING.

1,264,742.  Specification of Letters Patent.  Patented Apr. 30, 1918.

Application filed June 29, 1917. Serial No. 177,676.

*To all whom it may concern:*

Be it known that I, ROSCOE H. ALDRICH, a citizen of the United States, and a resident of Allentown, in the county of Lehigh and State of Pennsylvania, have invented a new and Improved Flexible Coupling, of which the following is a full, clear, and exact description.

My invention relates to flexible couplings, and has reference more particularly to the buffers of the coupling.

An object of the invention is to provide a simple, inexpensive and detachable buffer in the shape of a helical spring adapted to bear at the ends and in the central part.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in both views.

Figure 1:
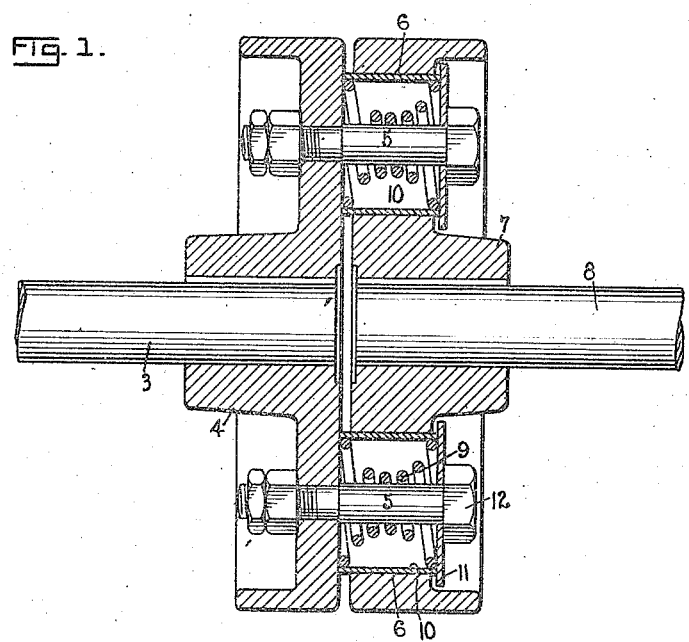
Figure 2:
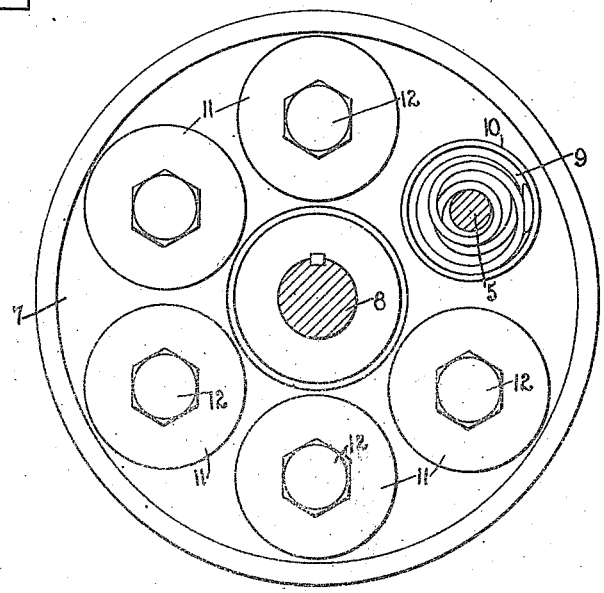

Figure 1 is an axial section of a flexible coupling provided with an embodiment of my invention; and Fig. 2 is a face elevation of the coupling, one of the bolts being broken away to show the helical spring.

Referring to the drawings, 3 is the driving shaft with which a coupling member 4 is constrained to revolve. A series of pins or bolts 5 are rigidly secured to the member 4. These members are disposed symmetrically and project through corresponding apertures 6 in a coöperating coupling member 7 constrained to revolve with the driven shaft 8. Each of the pins carries a helical spring 9 which is wider at the ends than in the middle. It is really a double conical spring converging toward the middle part of the spring. The inner diameter of the central part is substantially equal to the diameter of a pin 5, so as to bear thereon. The ends of the spring fit snugly into a shell 10 which is set into a corresponding aperture 6 of the coupling member 7. One end of the spring abuts against the face of the coupling member 4, and the other, against a disk 11 retained at the shell 10 by the head 12 of the pin 5.

By providing a double, conical helical spring which converges toward the middle I obtain a highly yielding buffer, the efficiency of which is particularly appreciable in the rotary direction, due to the bearings provided for the ends and central part of the spring, as previously mentioned. The springs can be easily removed and adjusted without taking apart or separating the coupling members.

I claim:

1. In a flexible coupling, a resilient buffer in the shape of a double, conical helical spring converging toward the middle.

2. In a flexible coupling, a buffer in the shape of a helical spring having its minimum diameter between the ends thereof.

3. In a flexible coupling, a driving member, a driven member, pins extending from the driving through the driven member, a helical spring having its minimum diameter between its ends for each of the pins, each of the springs bearing on the corresponding pin at its minimum diameter, and means in the driven member for engaging the ends of the spring.

4. In a flexible coupling, a driving member, a driven member, pins rigidly secured to the driving member projecting through the driven member, double, conical helical springs associated with said pins, said double, conical helical springs converging toward the middle, and their diameter at the middle being substantially equal to the diameter of the pins, whereby said pins form a bearing for said springs in the middle thereof, shells associated with the driven member, the diameter of said shells being substantially equal to the diameter of the spring at the ends, whereby said shells form bearings for the springs at the ends of the springs, and washers associated with the pins for retaining one end of the spring against the driving member and the other against the washer.

5. In a flexible coupling, a driving member, a driven member, tubular shells carried by the driven member, pins carried by the driving member projecting through the shells, helical springs of varying diameter in said shells about said pins, said helical springs having a bearing on the pins at their minimum diameter and in the shells at their maximum diameter, and means associated with the pins for retaining the springs in the shells.

6. In a flexible coupling, a driving member, a driven member, pins extending from the driving to the driven member, helical springs of varying diameter each having a bearing on a corresponding pin, and means for housing the springs in the driven member in which said helical springs also have a bearing.

7. In a flexible coupling, a resilient buffer in the shape of a helical spring of varying diameter.

ROSCOE HILTON ALDRICH.